(12) United States Patent
Hu et al.

(10) Patent No.: US 10,549,410 B2
(45) Date of Patent: *Feb. 4, 2020

(54) ELECTRIC RATCHET WRENCH

(71) Applicant: Bobby Hu, Taichung (TW)

(72) Inventors: Bobby Hu, Taichung (TW); Chi-Jui Lo, Taichung (TW)

(73) Assignee: Bobby Hu, Taichung (TW)

( * ) Notice: Subject to any disclaimer, the term of this patent is extended or adjusted under 35 U.S.C. 154(b) by 141 days.

This patent is subject to a terminal disclaimer.

(21) Appl. No.: 15/460,452

(22) Filed: Mar. 16, 2017

(65) Prior Publication Data

US 2017/0182639 A1    Jun. 29, 2017

Related U.S. Application Data

(63) Continuation of application No. 14/556,283, filed on Dec. 1, 2014, now Pat. No. 9,751,196.

(30) Foreign Application Priority Data

Sep. 11, 2014 (TW) .............................. 103131287 A

(51) Int. Cl.
  *B25B 21/00* (2006.01)
  *B25B 13/46* (2006.01)
  *H02K 7/14* (2006.01)

(52) U.S. Cl.
  CPC .......... *B25B 21/004* (2013.01); *B25B 13/465* (2013.01); *H02K 7/145* (2013.01)

(58) Field of Classification Search
  CPC .......................... B25B 21/004; B25B 13/465
  USPC ...................................................... 81/57.13
  See application file for complete search history.

(56) References Cited

U.S. PATENT DOCUMENTS

| | | | | |
|---|---|---|---|---|
| 2,179,724 A | * | 11/1939 | Kuehne | B25B 21/00 81/475 |
| 2,594,669 A | * | 4/1952 | Marshall | B25B 13/481 81/57.29 |
| 2,614,418 A | * | 10/1952 | Shaff | B25B 23/14 73/862.21 |
| 2,703,030 A | * | 3/1955 | Marvin | B25B 13/463 74/321 |

(Continued)

FOREIGN PATENT DOCUMENTS

| CN | 101269484 A | 9/2008 |
|---|---|---|
| CN | 201632960 U | 11/2010 |

(Continued)

*Primary Examiner* — Hadi Shakeri
(74) *Attorney, Agent, or Firm* — Viering, Jentschura & Partner mbB

(57) ABSTRACT

An electric ratchet wrench includes a driving member rotatably mounted in a body for driving a fastener. A pawl device is pivotably mounted to the driving member. First and second ring gears are rotatably mounted around the driving member and mesh with the pawl device. A direction switching rod is pivotably mounted to the driving member. A transmission shaft is rotatably received in the body and includes an end connected to a motor shaft of a motor. The other end of the transmission shaft is connected to a bevel gear disengageably meshed with the first and second ring gears. The transmission shaft can be driven by the motor shaft to drive the bevel gear, the first and second ring gears, and the driving member to rotate.

15 Claims, 14 Drawing Sheets

(56) References Cited

U.S. PATENT DOCUMENTS

| | | | | |
|---|---|---|---|---|
| 2,882,773 | A | * | 4/1959 | Wing .................... B25B 21/002 |
| | | | | 81/475 |
| 3,491,616 | A | | 1/1970 | Albert |
| 3,707,893 | A | | 1/1973 | Hofman |
| 3,756,090 | A | | 9/1973 | Mella et al. |
| 4,023,744 | A | | 5/1977 | Shutt |
| 4,311,072 | A | * | 1/1982 | Hudgins ................. B25B 17/00 |
| | | | | 81/476 |
| 4,406,184 | A | * | 9/1983 | Cockman, Jr. .......... B25B 17/00 |
| | | | | 81/57.29 |
| 4,524,649 | A | | 6/1985 | Diaz et al. |
| 4,920,832 | A | | 5/1990 | Van Gennep |
| 5,176,205 | A | | 1/1993 | Anthony |
| 5,201,255 | A | * | 4/1993 | Gegg .................... B25B 13/465 |
| | | | | 81/57.29 |
| 5,584,220 | A | | 12/1996 | Darrah et al. |
| 5,595,251 | A | | 1/1997 | Cook, Jr. |
| 5,647,254 | A | | 7/1997 | Cook, Jr. |
| 5,709,136 | A | | 1/1998 | Frenkel |
| 5,784,934 | A | | 7/1998 | Izumisawa |
| 5,887,493 | A | * | 3/1999 | Main .................... B25B 13/463 |
| | | | | 81/57.29 |
| 6,062,939 | A | | 5/2000 | Parker et al. |
| 6,070,499 | A | | 6/2000 | Wisbey |
| 6,216,562 | B1 | * | 4/2001 | Hsieh .................... B25B 17/00 |
| | | | | 81/57.29 |
| 6,311,583 | B1 | | 11/2001 | Izumisawa |
| 6,435,060 | B1 | | 8/2002 | Izumisawa |
| 6,457,386 | B1 | | 10/2002 | Chiang |
| 7,104,165 | B2 | | 9/2006 | Chu |
| 7,444,902 | B1 | | 11/2008 | Lin et al. |
| 7,571,668 | B1 | | 8/2009 | Chang |
| 7,823,486 | B2 | * | 11/2010 | Wise ...................... B25B 13/46 |
| | | | | 81/467 |
| 7,836,797 | B2 | * | 11/2010 | Hecht .................... B25B 21/00 |
| | | | | 81/57.14 |
| 8,800,410 | B1 | | 8/2014 | Huang |
| 9,546,829 | B2 | | 1/2017 | Howells et al. |
| 9,675,101 | B2 | * | 6/2017 | Conti ...................... A23N 1/02 |
| 2002/0184975 | A1 | | 12/2002 | Chen |
| 2003/0144615 | A1 | | 7/2003 | Lin |
| 2005/0090216 | A1 | | 4/2005 | Hsu et al. |
| 2005/0133330 | A1 | | 6/2005 | Stiefvater |
| 2007/0187220 | A1 | | 8/2007 | Chen |
| 2014/0083261 | A1 | * | 3/2014 | Wang ................... B25B 23/142 |
| | | | | 81/473 |

FOREIGN PATENT DOCUMENTS

| | | |
|---|---|---|
| EP | 0799112 B1 | 9/2004 |
| EP | 1498627 A1 | 1/2005 |
| FR | 2856324 A1 | 12/2004 |
| TW | 186569 B | 7/1992 |
| TW | 348096 B | 12/1998 |
| TW | 354928 U | 3/1999 |
| TW | 446605 B | 7/2001 |
| TW | 553808 B | 9/2003 |
| TW | M311540 U | 5/2007 |
| TW | I305741 B | 2/2009 |

\* cited by examiner

ELECTRIC RATCHET WRENCH

The present application is a Continuation application of U.S. patent application Ser. No. 14/556,283, filed on Dec. 1, 2014, of which the entire disclosure is incorporated herein.

BACKGROUND

The present invention relates to a ratchet wrench and, more particularly, to an electric ratchet wrench.

U.S. Pat. No. 8,800,410 discloses a ratchet wrench with a direction switching structure. The ratchet wrench includes a wrench body, a ratchet wheel, a ratcheting member, and a switching member. The ratchet wheel is rotatably mounted in the wrench body and can couple with a socket. The ratcheting member is mounted in the wrench body and is selectively engaged with the ratchet wheel by using a left half portion or a right half portion of ratchet teeth of the ratcheting member to switch the rotating direction of the ratchet wheel. The switching member is pivotably mounted in the body and abuts the ratcheting member.

A user has to grip the wrench body and rotate the wrench body in opposite directions to drive the socket in a single direction. Long bolts are commonly used in a building construction site. Considerable time is required for repeated operations of the long bolts in opposite directions. Furthermore, the long bolts are apt to rust in outdoor building construction sites, and the user has to spend time and effort to tighten or loosen the rusted long bolts with conventional ratchet wrenches.

Thus, a need exists for a novel electric ratchet wrench to mitigate and/or obviate the above disadvantages.

BRIEF SUMMARY

This need and other problems in the field of easy driving of ratchet wrenches are fulfilled by an electric ratchet wrench including a body having a first end and a second end. The first end of the body includes an inner periphery having a toothed portion. A ratchet device is mounted to the first end of the body. The ratchet device includes a driving member, a pawl device, a first ring gear rotatably mounted around the driving member, a second ring gear rotatably mounted around the driving member, and a direction switching rod received in the driving member. The pawl device is mounted between the first and second ring gears and includes two primary pawls, a first secondary pawl, and a second secondary pawl. Each of the two primary pawls is pivotably mounted to the driving member and is configured to selectively mesh with the toothed portion of the body. Each of the first and second ring gears is rotatable relative to the driving member in a clockwise direction or a counterclockwise direction. Each of the first and second ring gears includes an inner toothed portion on an inner periphery thereof and an end toothed portion on an end face thereof. The end toothed portions of the first and second ring gears face each other. The first secondary pawl is configured to selectively mesh with the inner toothed portion of the first ring gear. The second secondary pawl is configured to selectively mesh with the inner toothed portion of the second ring gear. The driving member includes an end adapted for directly or indirectly driving a fastener. The direction switching rod is pivotable relative to the driving member between two positions respectively corresponding to a driving direction and a non-driving direction. When the direction switching rod pivots between the two positions, an engagement status between each of the two primary pawls and the toothed portion of the body and an engagement status between the first and second secondary pawls and the first and second ring gears are changed to provide a direction switching function.

The electric ratchet wrench further includes a power device received in the second end of the body. The power device includes a motor and a power source. The motor includes a motor shaft. The power source is electrically connected to the motor for driving the motor shaft. A transmission device includes a transmission shaft, a bevel gear, and a first elastic element. The transmission shaft is rotatably mounted in the body and includes a first end coupled with the motor shaft of the motor. The transmission shaft further includes a second end with a transmission portion. The bevel gear is mounted around the transmission portion and is movable along the transmission shaft to selectively mesh with or disengage from the end toothed portions of the first and second ring gears. The first elastic element is mounted around the transmission portion of the transmission shaft and biases the bevel gear to mesh with the end toothed portions of the first and second ring gears.

When the bevel gear meshes with the end toothed portions of the first and second ring gears and when the motor shaft of the motor drives the transmission shaft and the bevel gear to rotate, the bevel gear drives the first and second ring gears to respectively rotate in the clockwise direction or the counterclockwise direction relative to the driving member, and the two primary pawls and one of the first and second secondary pawls actuate the driving member to rotate to thereby rotate the fastener.

If a resistance larger than a torque outputted by the motor shaft is encountered at a position while driving the fastener and causes a tooth slippage phenomenon in which the bevel gear repeatedly engages with and disengages from the end tooth portions of the first and second ring gears, the body can be manually rotated to overcome the resistance and to forcibly drive the fastener through the position at the moment the bevel gear engages with the end tooth portions of the first and second ring gears, and the bevel gear reengages with the end tooth portions of the first and second ring gears after the fastener passes through the position.

The body can include a connection hole having first, second, and third sections arranged along a first axis. The first section has a first inner diameter perpendicular to the first axis. The second section has a second inner diameter perpendicular to the first axis. The second inner diameter is smaller than the first inner diameter. The third section has two ends respectively connected to the first and second sections. An inner wall face of the third section is at a first angle of 120° to an inner wall face of the first section. The transmission shaft is rotatably received in the connection hole and includes a connection portion having the first end. The transmission shaft further includes a shoulder connected between the transmission portion and the connection portion. The first elastic element is mounted between the shoulder and the bevel gear. The connection portion has a first outer diameter perpendicular to the first axis. The shoulder has a second outer diameter perpendicular to the first axis. The second outer diameter is smaller than the first outer diameter. The connection portion has a conical face connected to the shoulder. The conical face of the connection portion is at a second angle of 120° to an outer face of the shoulder.

The transmission device can further include a first ball unit having a plurality of balls arranged in a circumferential direction about the first axis. The plurality of balls is mounted in the third section of the connection hole and is located between the connection portion and the shoulder of the transmission shaft.

The motor shaft of the motor can include a first shaft section and a second shaft section arranged along the first axis. The first shaft section has a first shaft diameter perpendicular to the first axis and has circular cross sections perpendicular to the first axis. The second shaft section has a second shaft diameter perpendicular to the first axis and has semi-circular cross sections perpendicular to the first axis. The second shaft diameter is smaller than the first shaft diameter. The transmission device can further include a first washer, a second elastic element, a second washer, and a second ball unit. The first washer has a semi-circular hole corresponding to the second shaft section of the motor shaft. The second washer has a circular hole. The first washer, the second elastic element, and the second washer are mounted around the second shaft section of the motor shaft in sequence. A side of the first washer abuts the first shaft section. The second elastic element is mounted between the other side of the first washer and a side of the second washer facing away from the second ball unit. The second washer is received in the first section of the connection hole. The first end of the transmission shaft can include a receptacle receiving the second shaft section of the motor shaft. The first end of the transmission shaft can further include a reduced section having an outer periphery and an annular end face. The second ball unit includes a plurality of balls arranged in a circumferential direction about the first axis and located between an inner periphery of the first section of the connection hole and the outer periphery of the reduced section of the first end of the transmission shaft and located between the second washer and the annular end face of the reduced section of the first end of the transmission shaft.

Each of the first and second elastic elements can be a coil spring. The first elastic element has a stiffness coefficient smaller than a stiffness coefficient of the second elastic element.

The body can include a head, a handle adapted to be held by a user, and an extension between the head and the handle. The head is located on the first end of the body. The handle is located between the extension and the second end of the body along the first axis. The head includes a driving hole and a transmission groove intercommunicated with the driving hole. The driving hole includes the inner periphery having the toothed portion. The handle includes a compartment receiving the power device. The connection hole is defined in the extension. The extension has substantially rectangular cross sections perpendicular to the first axis.

The transmission groove can be crescent in cross section and can be defined in the head. The transmission groove includes two closed ends spaced from each other in a transverse direction perpendicular to the first axis.

The handle of the body includes a through-hole extending in a radial direction perpendicular to the first axis. The through-hole intercommunicates with the compartment. The power device includes a control button received in the through-hole of the body and electrically connected to the motor. The control button can be operated to control the motor.

The motor can be a monodirectional motor. The motor shaft is rotatable about the first axis. The driving member is rotatably mounted in the body and is rotatable about a second axis perpendicular to the first axis. Each of the first and second ring gears is rotatable about the second axis in the clockwise direction or the counterclockwise direction relative to the driving member. One of the two primary pawls and the first secondary pawl are jointly pivotable about a third axis parallel to the second axis. The other of the two primary pawls and the second secondary pawl are jointly pivotable about a fourth axis parallel to the second axis. The second axis is located between the third and fourth axes. The two primary pawls are located on the same level along the second axis. The first secondary pawl and the second secondary pawl are opposed to each other in a diametric direction perpendicular to the second axis and are located on different levels along the second axis. The two primary pawls are located between the first and second secondary pawls along the second axis.

The direction switching rod can include a through-hole extending in a diametric direction perpendicular to the second axis. The direction switching rod can further include a first receptacle having a first opening. The direction switching rod can further include a second receptacle having a second opening. The through-hole of the direction switching rod is located between the first and second receptacles along the second axis. The second opening faces away from the first opening and is diametrically opposed to the first opening. The driving device can include a primary pressing unit, a first pressing unit, and a second pressing unit. The primary pressing unit is mounted in the through-hole of the direction switching rod and includes two first pressing members and an elastic element mounted between the two first pressing members and biasing the two first pressing members to respectively press against the two primary pawls. The first pressing unit is mounted in the first receptacle of the direction switching rod and includes a second pressing member and an elastic element biasing the second pressing member to press against the first secondary pawl. The second pressing unit is mounted in the second receptacle of the direction switching rod and includes a third pressing member and an elastic element biasing the third pressing member to press against the second secondary pawl.

Illustrative embodiments will become clearer in light of the following detailed description described in connection with the drawings.

DESCRIPTION OF THE DRAWINGS

The illustrative embodiments may best be described by reference to the accompanying drawings where.

Figure 1:
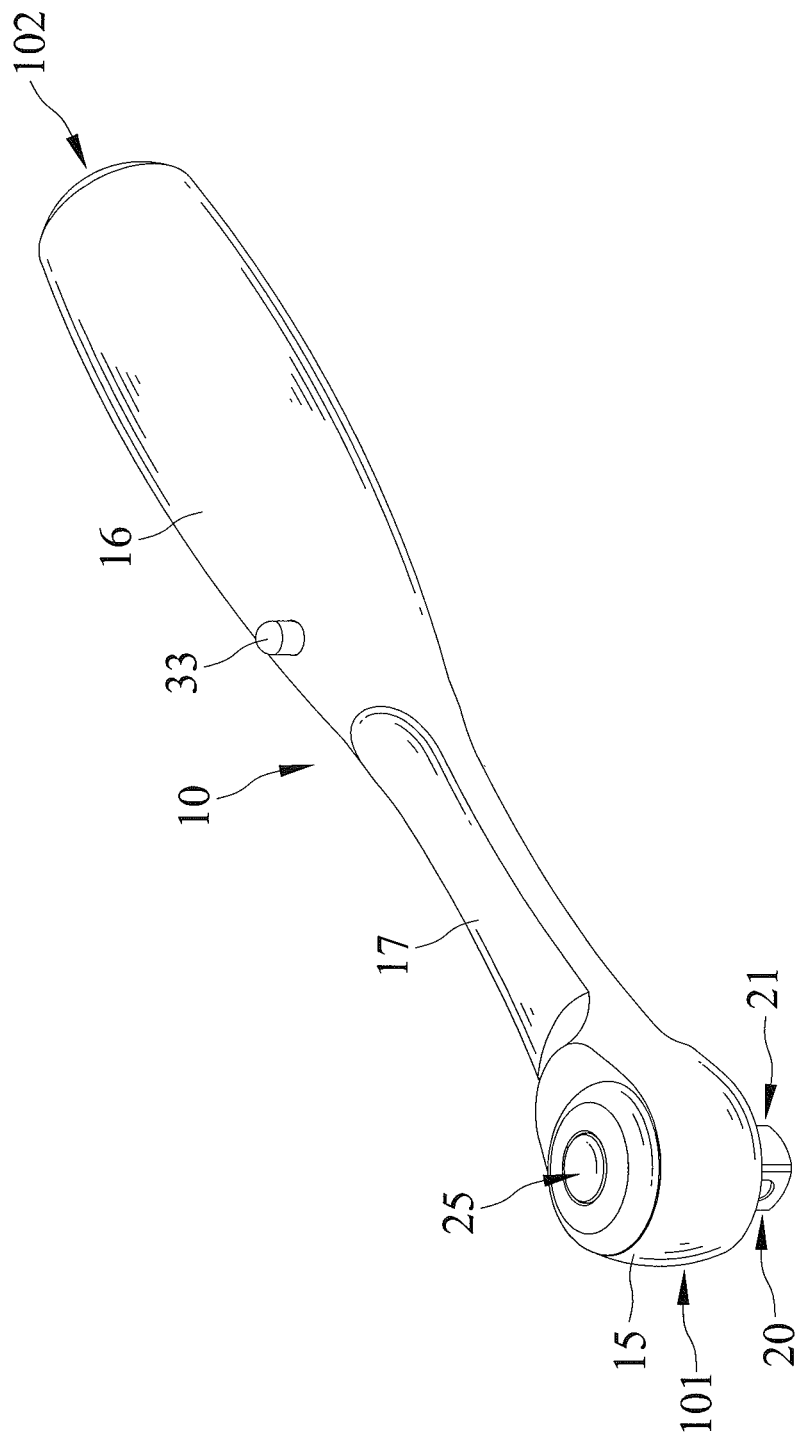
FIG. 1 is a perspective view of an electric ratchet wrench of an embodiment according to the present invention.
Figure 2:
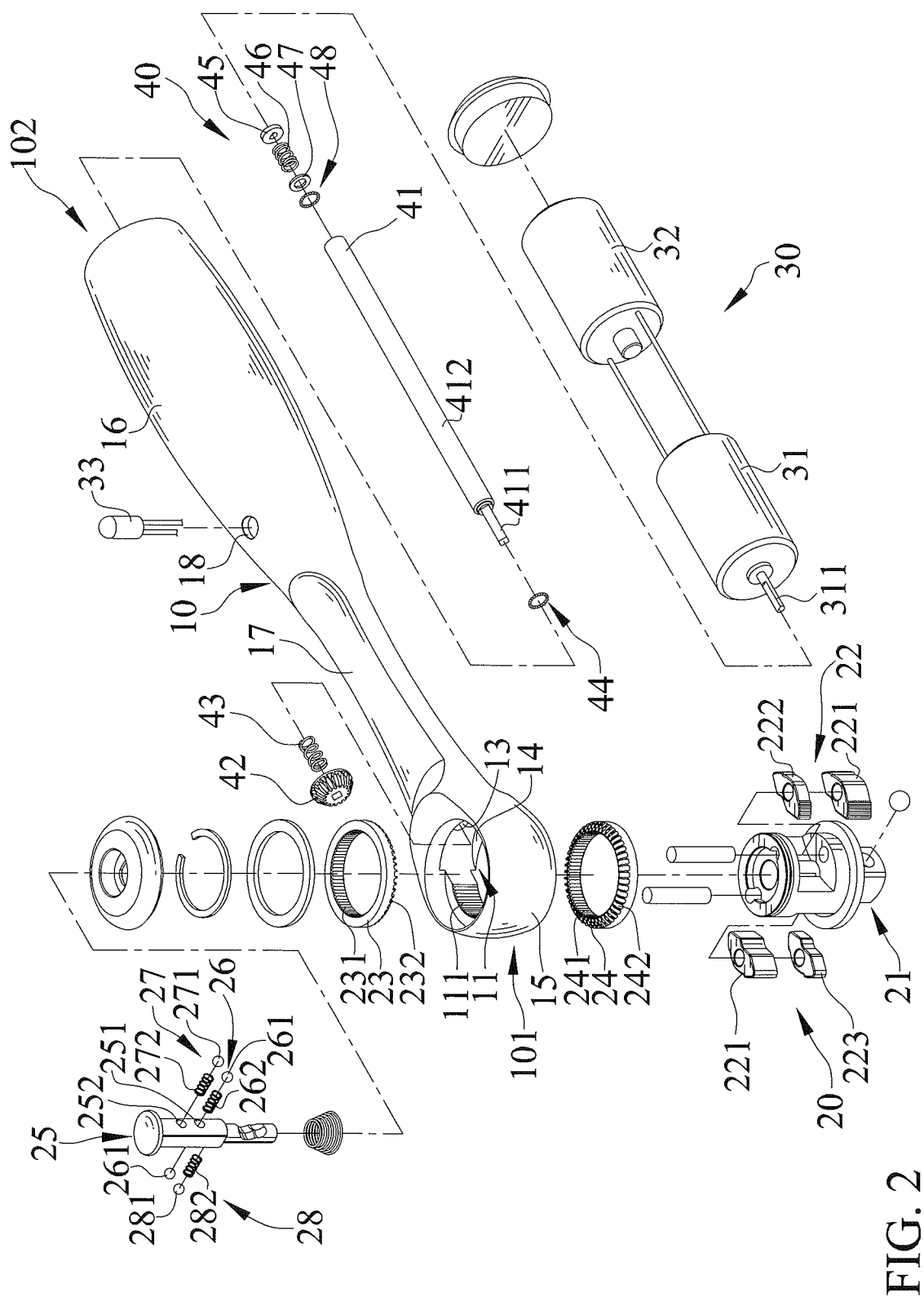
FIG. 2 is an exploded, perspective view of the electric ratchet wrench of FIG. 1.
Figure 3:
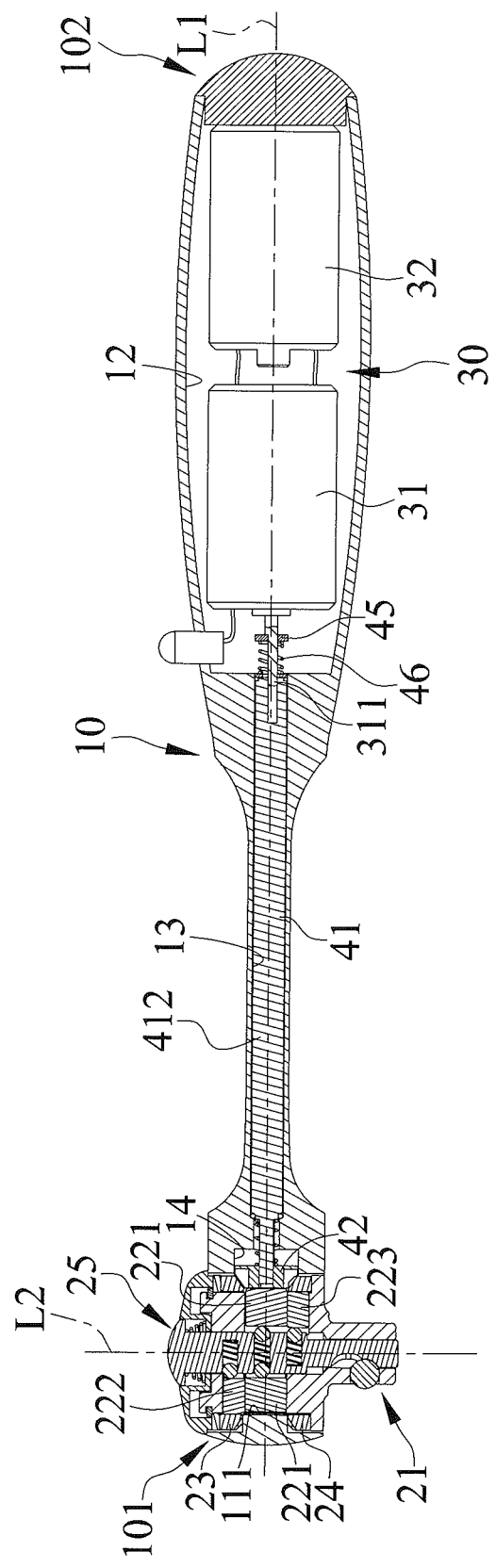
FIG. 3 is a cross sectional view of the electric ratchet wrench of FIG. 1.
Figure 4:
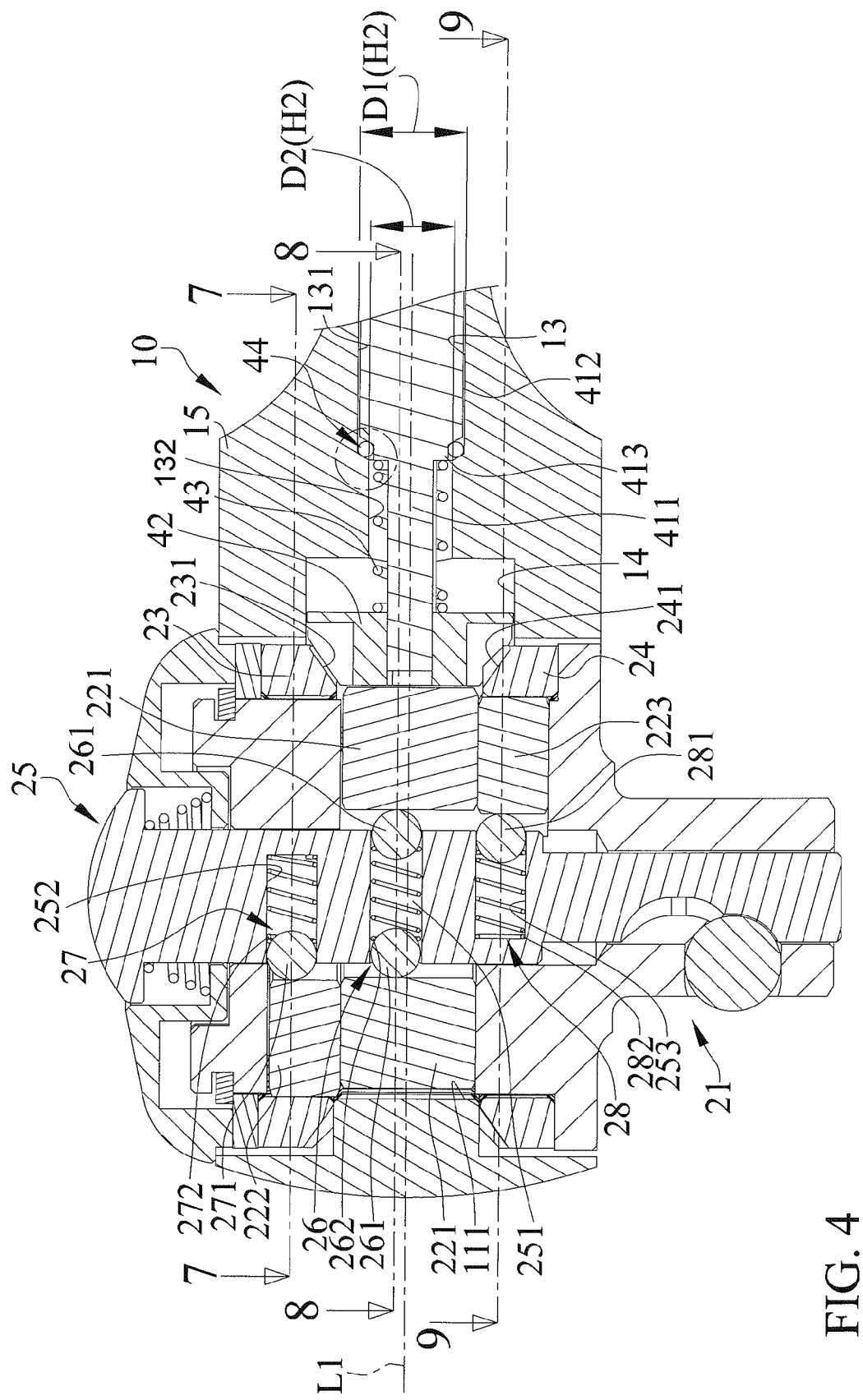
FIG. 4 is an enlarged view of a portion of FIG. 3 with a bevel gear meshed with a first ring gear and a second ring gear.
Figure 5:
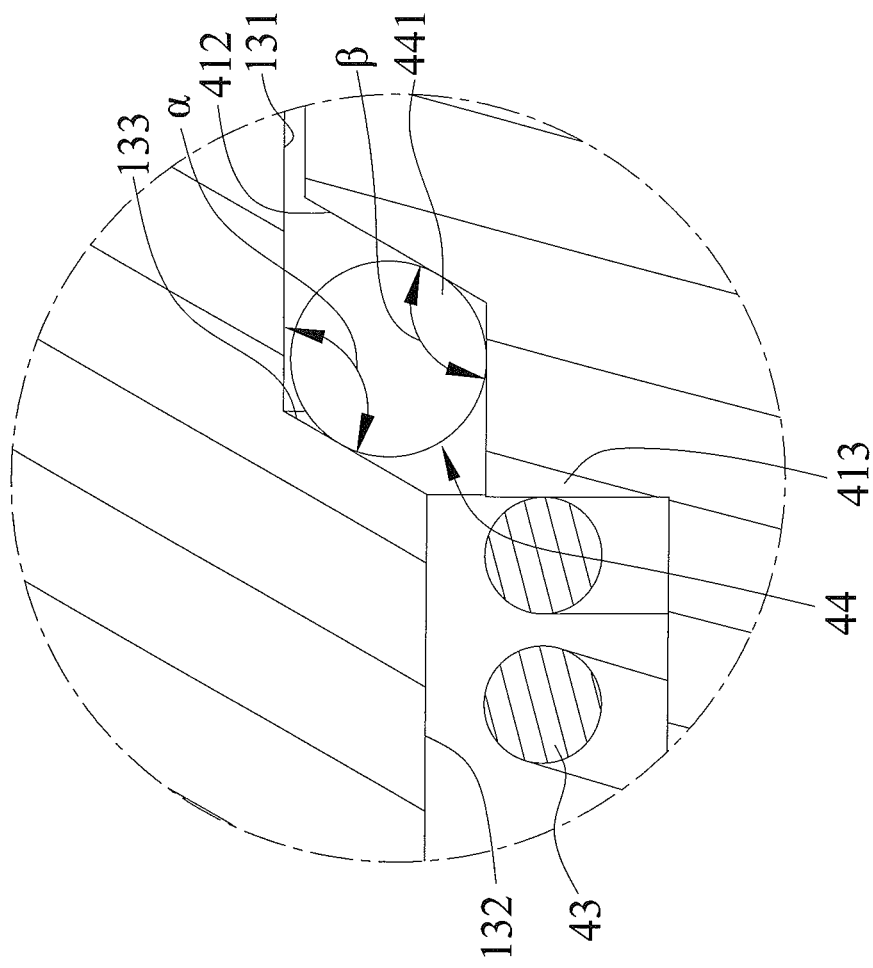
FIG. 5 is an enlarged view of a circled portion of FIG. 4, illustrating an arrangement of a first ball unit around a transmission shaft.
Figure 6:
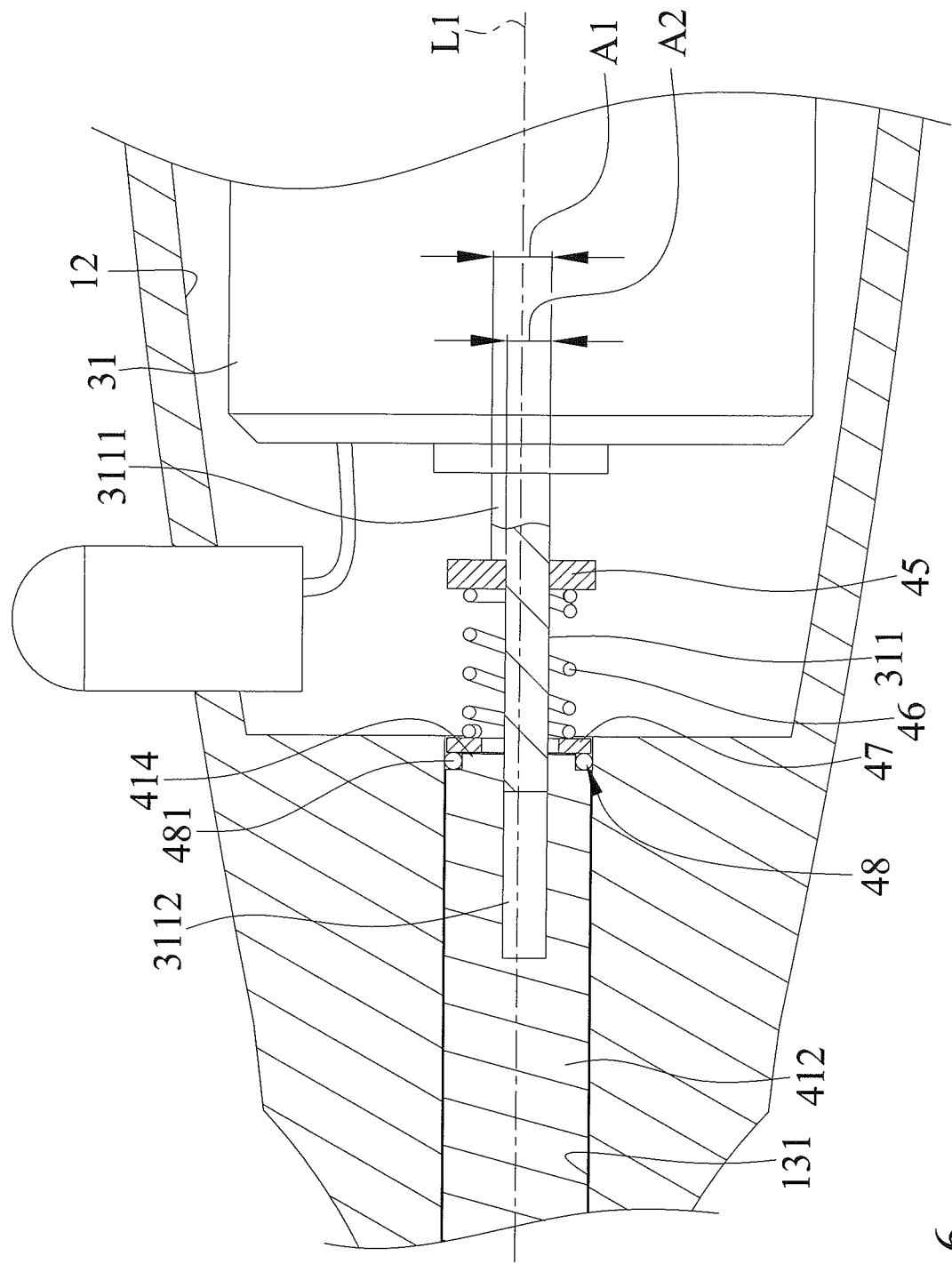
FIG. 6 is an enlarged view of a portion of FIG. 3, illustrating a connection between the transmission shaft and a motor.
Figure 7:
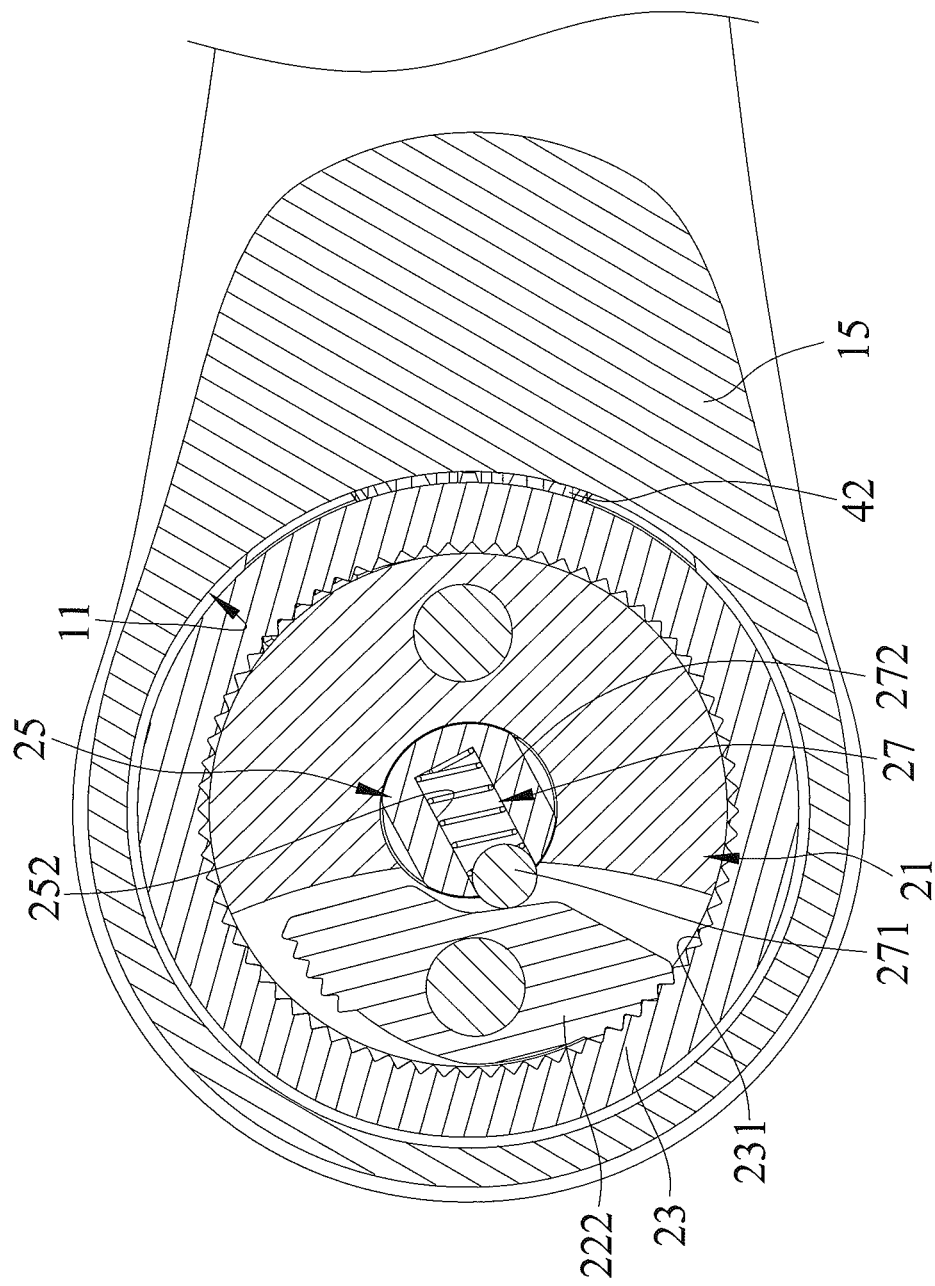
FIG. 7 is a cross sectional view taken along section line 7-7 of FIG. 4.
Figure 8:
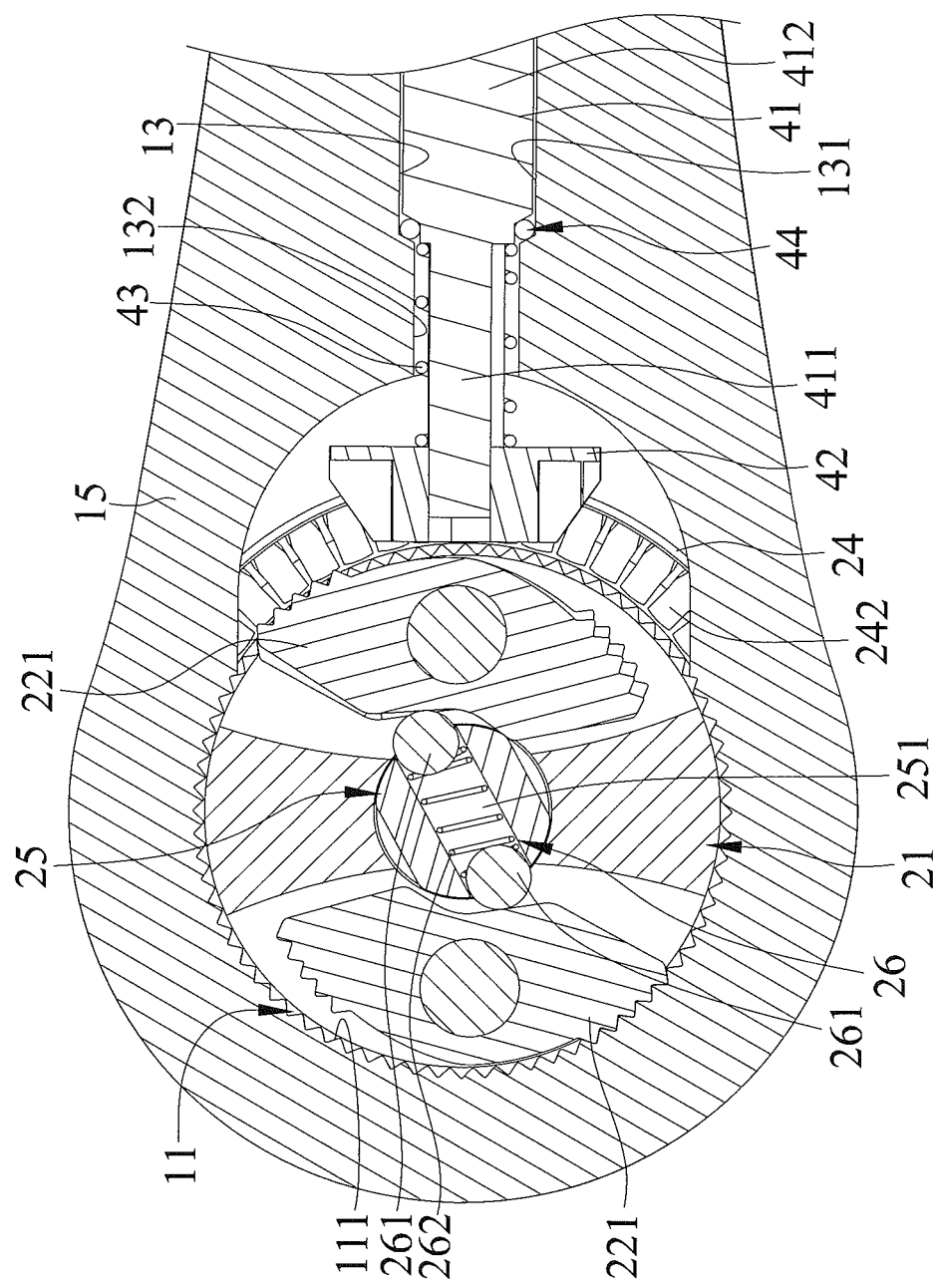
FIG. 8 is a cross sectional view taken along section line 8-8 of FIG. 4.
Figure 9:
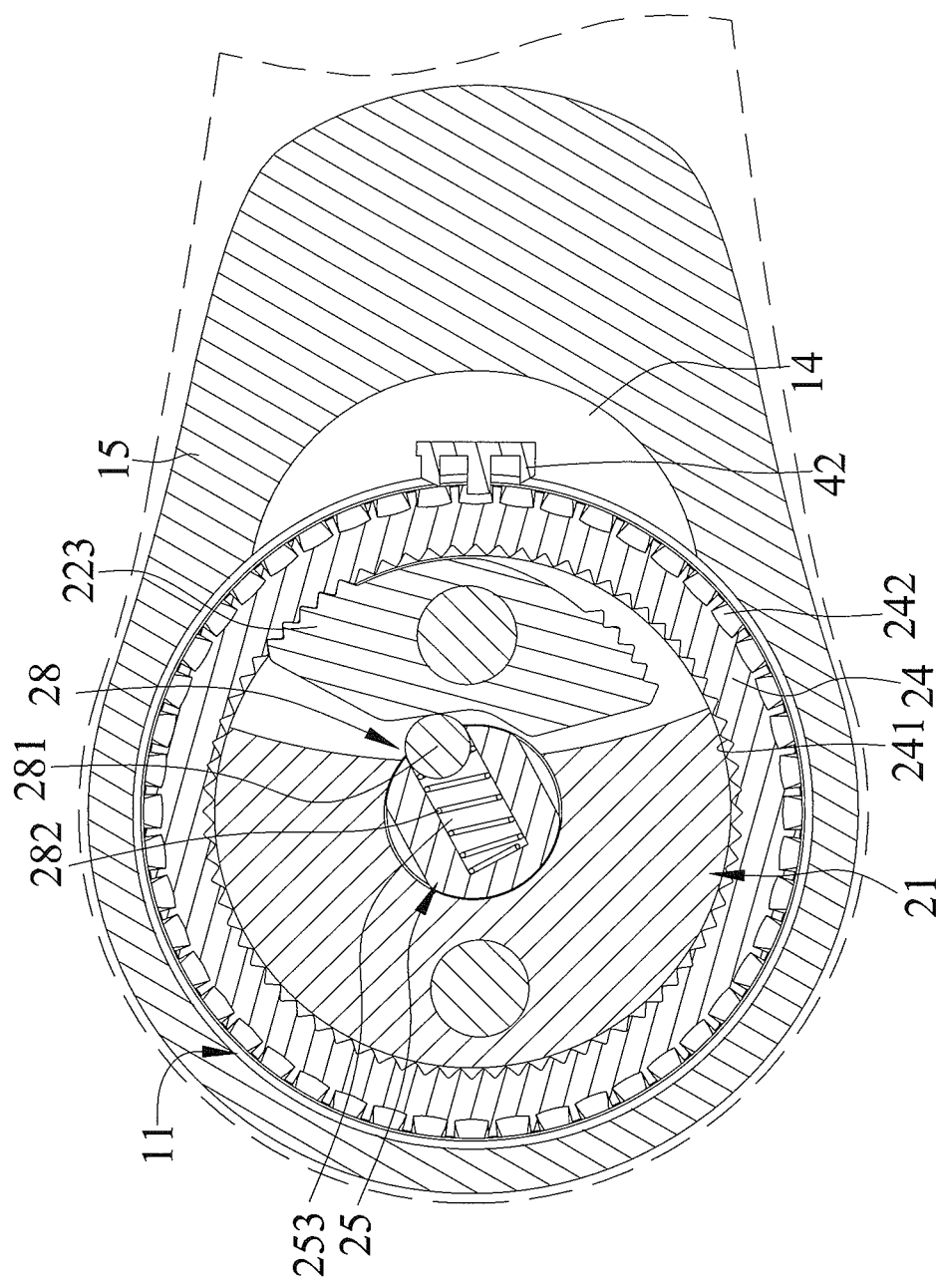
FIG. 9 is a cross sectional view taken along section line 9-9 of FIG. 4.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "bottom", "side", "end", "portion", "section", "spacing", "length", "depth", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION

FIGS. 1-14 show an electric ratchet wrench of an embodiment according to the present invention. The electric ratchet wrench includes a body 10, a driving device 20, a power device 30, and a transmission device 40.

Body 10 includes a first end 101 and a second end 102 spaced from first end 101 along a first axis L1. Body 10 further includes a driving hole 11, a compartment 12, a connection hole 13, and a transmission groove 14. Driving hole 11 is defined in first end 101 of body 10 and includes an inner periphery having a toothed portion 111 distant to compartment 12. Compartment 12 is adjacent to second end 102 of body 10 and intercommunicates with an end of connection hole 13. The other end of connection hole 13 intercommunicates with an end of transmission groove 14. The other end of transmission groove 14 intercommunicates with driving hole 11.

Connection hole 13 of body 10 includes first, second, and third sections 131, 132, and 133 arranged along first axis L1. First section 131 has a first inner diameter D1 perpendicular to first axis L1. Second section 132 has a second inner diameter D2 perpendicular to first axis L1. Second inner diameter D2 is smaller than first inner diameter D1. Third section 133 has two ends respectively connected to first and second sections 131 and 132. An inner wall face of third section 133 is at a first angle α to an inner wall face of first section 131. First angle α is preferably 120°. In manufacture of connection hole 13 of body 10, a drill with a diameter equal to first inner diameter D1 is used to firstly form first section 131. Then, another drill with a diameter equal to second inner diameter D2 is used to form second section 132 intercommunicated with transmission groove 14. After processing by a cutting end of the drill with a diameter equal to first inner diameter D1, first angle α of 120° can be formed between the inner wall face of third section 133 and the inner wall face of first section 131. The manufacturing costs are reduced by rapid processing.

In the form shown, body 10 includes a head 15, a handle 16 adapted to be held by a user, and an extension 17 between head 15 and handle 16. Head 15 is located on first end 101 of body 10. Handle 16 is located between extension 17 and second end 102 of body 10 along first axis L1. In this embodiment, extension 17 is connected to head 15 and handle 16 by friction welding.

In the form shown, head 15 includes driving hole 11 and transmission groove 14. Handle 16 includes compartment 12. Connection hole 13 is defined in extension 17. Extension 17 has substantially rectangular cross sections perpendicular to first axis L1 to provide a flat handle 16. Generally, the structural strength of flat handle 16 is better than conventional cylindrical handles in application of a radial force. Namely, the electric ratchet wrench according to the present invention possesses better structural strength.

In the form shown, transmission groove 14 is crescent in cross section and is defined in head 15. Transmission groove 14 includes two closed ends spaced from each other in a transverse direction perpendicular to first axis L1.

In the form shown, handle 16 of body 10 includes a through-hole 18 extending in a radial direction perpendicular to first axis L1. Through-hole 18 intercommunicates with compartment 12.

Ratchet device 20 is mounted to first end 101 of body 10. Ratchet device 20 includes a driving member 21, a pawl device 22, a first ring gear 23 rotatably mounted around driving member 21, a second ring gear 24 rotatably mounted around driving member 21, and a direction switching rod 25 received in driving member 21. Driving member 21 is rotatably mounted in body 10 and is rotatable about a second axis L2 perpendicular to first axis L1. An end of driving member 21 adjacent to second ring gear 24 is adapted for directly or indirectly driving a fastener. In the form shown, the end of driving member 21 can couple with a socket.

Pawl device 22 is mounted between first and second ring gears 23 and 24 and includes two primary pawls 221, a first secondary pawl 222, and a second secondary pawl 223. Each primary pawl 221 is pivotably mounted to driving member 21 and is configured to selectively mesh with toothed portion 111 of body 10.

In the form shown, one of the two primary pawls 221 and first secondary pawl 222 are jointly pivotable about a third axis parallel to the second axis L2. The other primary pawl 221 and second secondary pawl 223 are jointly pivotable about a fourth axis parallel to the second axis L2. Second axis L2 is located between the third and fourth axes. Primary pawls 221 are located on the same level along second axis L2. First secondary pawl 222 and second secondary pawl 223 are opposed to each other in a diametric direction perpendicular to second axis L2 and are located on different levels along second axis L2. Primary pawls 221 are located between first and second secondary pawls 222 and 223 along second axis L2.

Each of first and second ring gears 23 and 24 is rotatable relative to driving member 21 in a clockwise direction or a counterclockwise direction. Each of the first and second ring gears 23 and 24 includes an inner toothed portion 231, 241 on an inner periphery thereof and an end toothed portion 232, 242 on an end face thereof. End toothed portions 232 and 242 of first and second ring gears 23 and 24 face each other. First secondary pawl 222 is configured to selectively mesh with inner toothed portion 231 of first ring gear 23.

Second secondary pawl 223 is configured to selectively mesh with inner toothed portion 241 of second ring gear 24.

Direction switching rod 25 is pivotable about second axis L2 relative to driving member 21 between two positions respectively corresponding to a driving direction and a non-driving direction. When direction switching rod 25 pivots between the two positions, an engagement status between each primary pawl 221 and toothed portion 111 of body 10 and an engagement status between first and second secondary pawls 222 and 223 and first and second ring gears 23 and 24 are changed to provide a direction switching function, which can be appreciated by one having ordinary skill in the art.

In the form shown, direction switching rod 25 includes a through-hole 251 extending in a diametric direction perpendicular to second axis L2. Direction switching rod 25 further includes a first receptacle 252 having a first opening. Direction switching rod 25 further includes a second receptacle 253 having a second opening. Through-hole 251 of direction switching rod 25 is located between first and second receptacles 252 and 253 along second axis L2. The second opening faces away from the first opening and is diametrically opposed to the first opening.

In the form shown, driving device 20 includes a primary pressing unit 26, a first pressing unit 27, and a second pressing unit 28. Primary pressing unit 26 is mounted in through-hole 251 of direction switching rod 25 and includes two first pressing members 261 and an elastic element 262 mounted between first pressing members 261 and biasing first pressing members 261 to respectively press against primary pawls 221. First pressing unit 27 is mounted in first receptacle 252 of direction switching rod 25 and includes a second pressing member 271 and an elastic element 272 biasing second pressing member 271 to press against first secondary pawl 222. Second pressing unit 28 is mounted in second receptacle 253 of direction switching rod 25 and includes a third pressing member 281 and an elastic element 282 biasing third pressing member 281 to press against second secondary pawl 223. Thus, the user can pivot direction switching rod 25 between the two positions to achieve the direction changing function, as mentioned above.

Power device 30 is received in compartment 12 of body 10 and includes a motor 31 and a power source 32. In this embodiment, motor 31 is a monodirectional motor fixed in compartment 12 and includes a motor shaft 311. Power source 32 is in the form of a cell and is electrically connected to motor 31 for driving motor shaft 311 to rotate about first axis L1. Motor shaft 311 of motor 31 includes a first shaft section 3111 and a second shaft section 3112 arranged along first axis L1. First shaft section 3111 has a first shaft diameter A1 perpendicular to first axis L1 and has circular cross sections perpendicular to first axis L1. Second shaft section 3112 has a second shaft diameter A2 perpendicular to first axis L1 and has semi-circular cross sections perpendicular to first axis L1. Second shaft diameter A2 is smaller than first shaft diameter A1. Power device 30 further includes a control button 33 received in through-hole 18 of body 10 and electrically connected to motor 31. Control button 33 can be operated to control motor 31.

Transmission device 40 includes a transmission shaft 41, a bevel gear 42, and a first elastic element 43. Transmission shaft 41 is received in connection hole 13 of body 10 and is rotatable about first axis L1. Transmission shaft 41 includes a first end 414 coupled with motor shaft 311 of motor 31. Transmission shaft 41 further includes a second end with a transmission portion 411. Transmission portion 411 has rectangular cross sections perpendicular to first axis L1. Bevel gear 42 is mounted in transmission groove 14 and is around transmission portion 411. Bevel gear 42 is movable in first axis L1 along transmission shaft 41 to selectively mesh with or disengage from end toothed portions 232 and 242 of first and second ring gears 23 and 24. First elastic element 43 is mounted around transmission portion 411 of transmission shaft 41 and biases bevel gear 42 to mesh with end toothed portions 232 and 242 of first and second ring gears 23 and 24.

In the form shown, transmission shaft 41 includes a connection portion 412 having the first end 414. Transmission shaft 41 further includes a shoulder 413 connected between transmission portion 411 and connection portion 412. First elastic element 43 is mounted between shoulder 413 and bevel gear 42. Connection portion 412 has a first outer diameter H1 perpendicular to first axis L1. Shoulder 413 has a second outer diameter H2 perpendicular to first axis L1. Second outer diameter H2 is smaller than first outer diameter H1. Connection portion 412 has a conical face connected to shoulder 413. The conical face of connection portion 412 is at a second angle β to an outer face of shoulder 413. Preferably, second angle β is 120°.

In the form shown, transmission device 40 further includes a first ball unit 44, a first washer 45, a second elastic element 46, a second washer 47, and a second ball unit 48. First ball unit 44 has a plurality of balls 441 arranged in a circumferential direction about first axis L1. Balls 441 are mounted in third section 133 of connection hole 13 and are located between connection portion 412 and shoulder 413 of transmission shaft 41. First washer 45 has a semi-circular hole corresponding to second shaft section 3112 of motor shaft 311. Second washer 47 has a circular hole. First washer 45, second elastic element 46, and second washer 47 are mounted around second shaft section 3112 of motor shaft 311 in sequence. A side of first washer 45 abuts first shaft section 3111 such that first washer 45 cannot slide to first shaft section 3111 of motor shaft 311. Second elastic element 46 is mounted between the other side first washer 45 and a side of second washer 47 facing away from second ball unit 48. Second washer 47 is received in the first section 131 of connection hole 13.

In the form shown, first end 414 of transmission shaft 41 includes a receptacle receiving second shaft section 3112 of motor shaft 311. First end 414 of transmission shaft 41 further includes a reduced section having an outer periphery and an annular end face. Second ball unit 48 includes a plurality of balls 481 arranged in a circumferential direction about first axis L1. Balls 481 are located between an inner periphery of first section 131 of connection hole 13 and the outer periphery of the reduced section of first end 414 of transmission shaft 41 and are located between second washer 47 and the annular end face of the reduced section of first end 414 of transmission shaft 41.

In the form shown, each of first and second elastic elements 43 and 46 is a coil spring. First elastic element 43 has a stiffness coefficient smaller than a stiffness coefficient of second elastic element 46.

Figure 10:
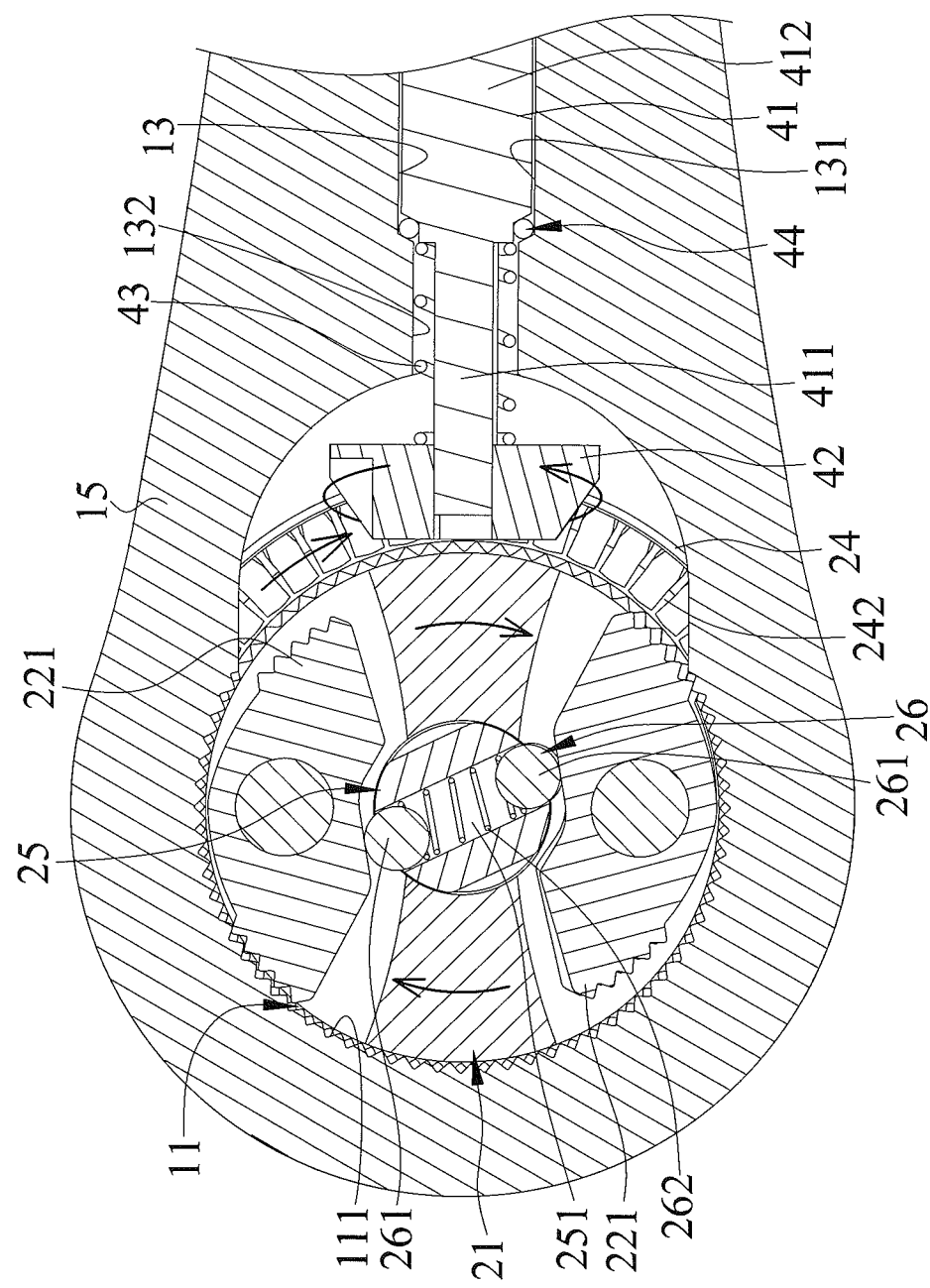
FIG. 10 is a view similar to FIG. 8 with the second ring gear driven by the bevel gear.
Figure 11:
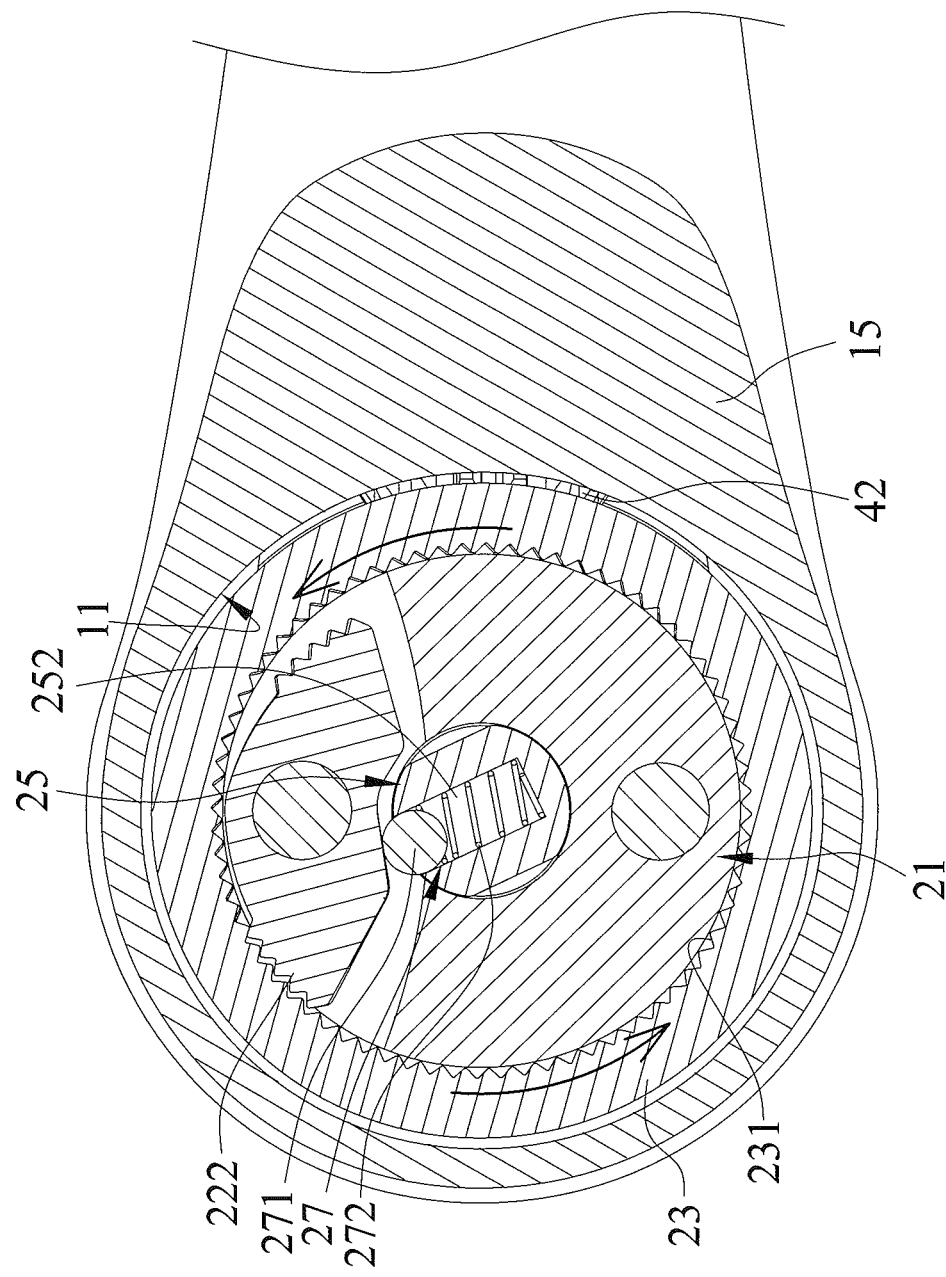
FIG. 11 is a view similar to FIG. 7 with the first ring gear driven by the bevel gear to rotate a driving member.
Figure 12:
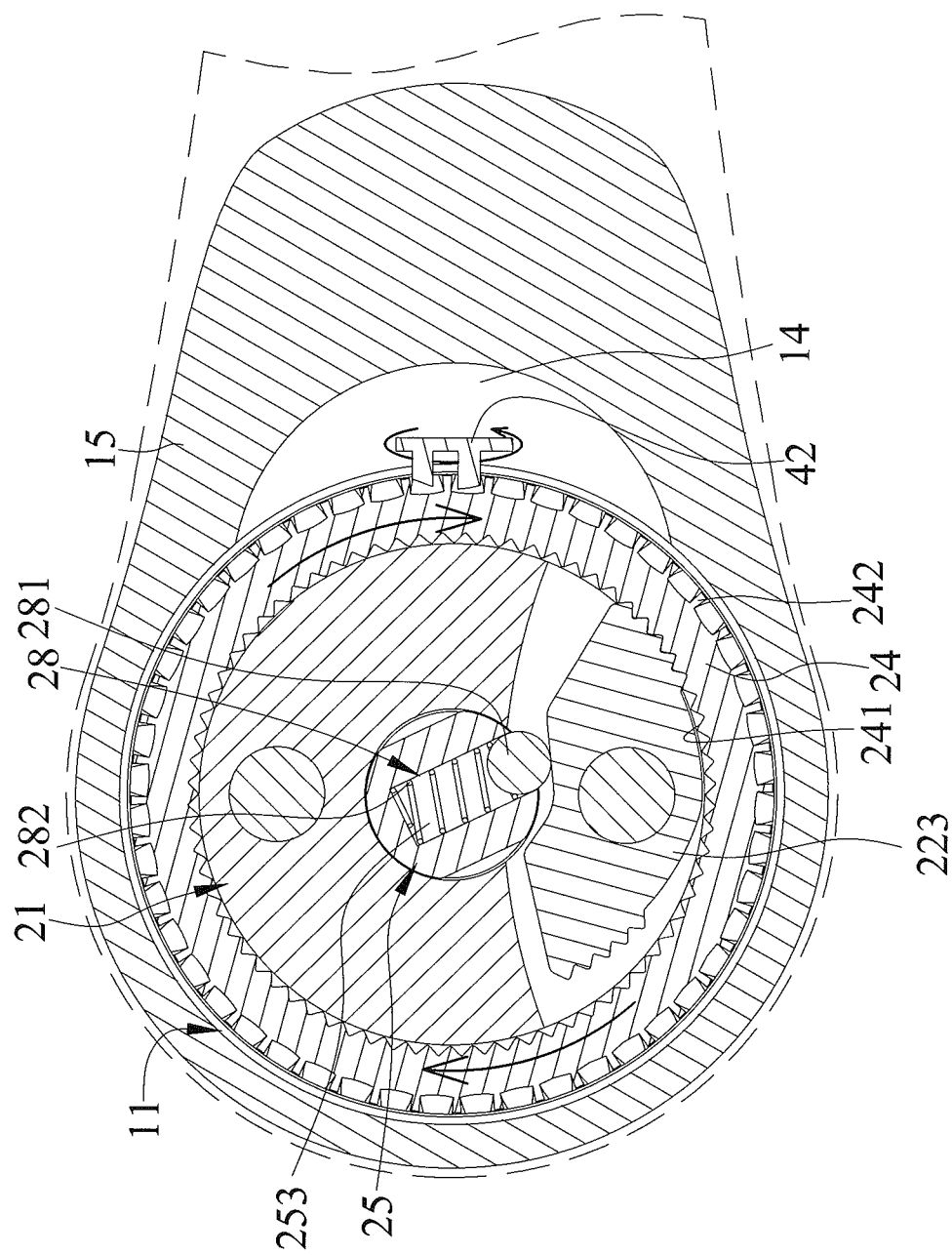
FIG. 12 is a view similar to FIG. 9 with the second ring gear driven by the bevel gear to rotate the driving member.

With reference to FIGS. 10-12, when bevel gear 42 meshes with end toothed portions 232 and 242 of first and second ring gears 23 and 24 and when motor shaft 311 of motor 31 drives transmission shaft 41 and bevel gear 42 to rotate, bevel gear 42 drives first and second ring gears 23 and 24 to respectively rotate in the clockwise direction or the counterclockwise direction relative to driving member 21. Primary pawls 221 and one of first and second secondary pawls 222 and 223 actuate driving member 21 to rotate to thereby rotate the fastener. Thus, the electric ratchet wrench can drive driving member 21 to rotate about second axis L2 by rotating motor shaft 311 of motor 31 about first axis L1 without moving handle 16.

Figure 13:
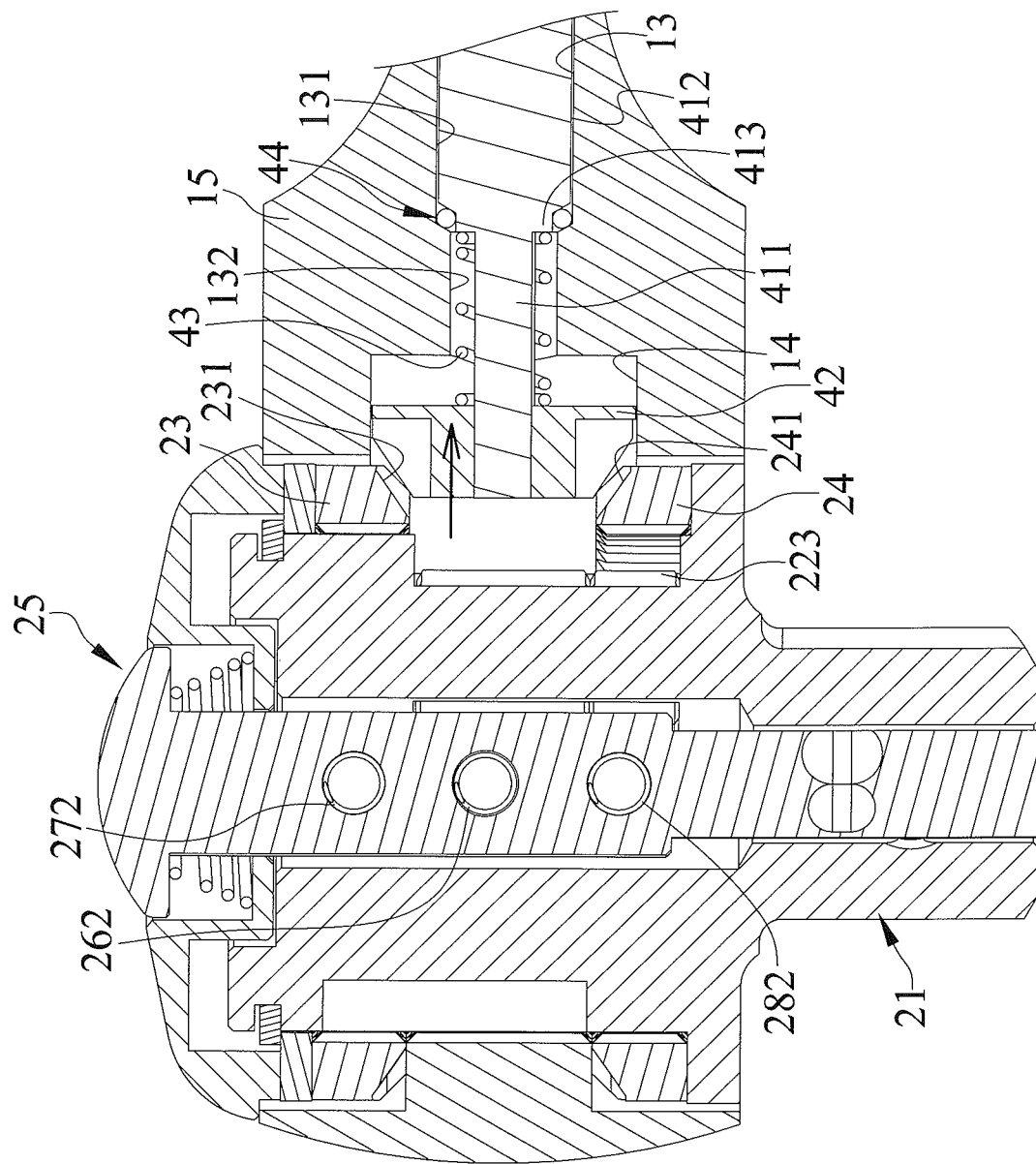
FIG. 13 is a view similar to FIG. 4 with the bevel gear disengaged from the first and second ring gears.
Figure 14:
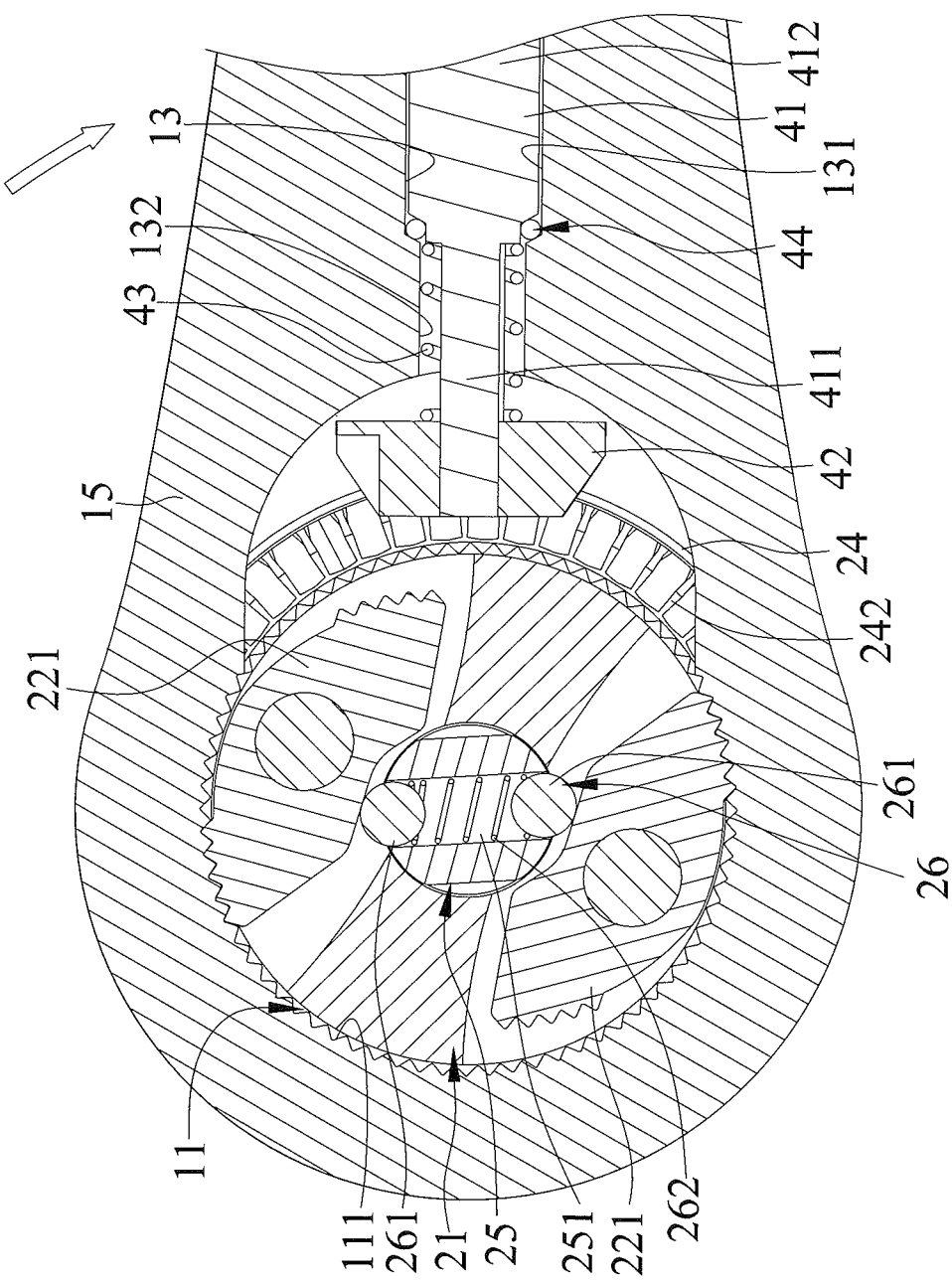
FIG. 14 is a view similar to FIG. 10 with the bevel gear disengaged from the first and second ring gears.

With reference to FIGS. 13 and 14, if a resistance larger than a torque outputted by motor shaft 311 is encountered at a position while driving the fastener (such as a rusted long bolt on a construction site), the torque outputted by motor shaft 311 is not sufficient to drive transmission shaft 41 to rotate driving member 21. Namely, driving member 21 cannot drive the fastener. In this case, bevel gear 42 slides relative to transmission portion 411 of transmission shaft 41 along first axis L1 to disengage from end toothed portions 232 and 242 of first and second ring gears 23 and 24 and compresses first elastic element 43. Nevertneless, second elastic element 46 biases second washer 47 and transmission shaft 41 to press bevel gear 42 against first and second ring gears 23 and 24, but a tooth slippage phenomenon (bevel gear 42 repeatedly engages with and disengages from end tooth portions 232 and 242 of first and second ring gears 23 and 24) occurs such that bevel gear 42 cannot engage with first and second ring gears 23 and 24 while motor 31 keeps rotating. The user can hear clicks resulting from the tooth slippage phenomenon and, thus, be aware of failure of engagement of bevel gear 42 with first and second ring gears 23 and 24. In this case, the user can manually rotate body 10 to overcome the resistance and to forcibly drive the fastener through the position at the moment the bevel gear 42 engages with end tooth portions 232 and 242 of first and second ring gears 23 and 24. Bevel gear 42 reengages with end tooth portions 232 and 242 of first and second ring gears 23 and 24 after the fastener passes through the large-resistance position. Thus, driving member 21 can be driven by motor 31 again to rotate about second axis L2 to thereby drive the fastener to rotate. Thus, the problems of conventional ratchet wrenches resulting from excessive large resistances are overcome.

In view of the foregoing, the electric ratchet wrench according to the present invention can drive driving member 21 to rotate about second axis L2 by rotating motor shaft 311 of motor 31 about first axis L1 without moving handle 16. A force-saving effect is, thus, provided.

Furthermore, extension 17 of the electric ratchet wrench according to the present invention has substantially rectangular cross sections perpendicular to first axis L1 to provide a flat handle 16 having a structural strength better than conventional cylindrical handles in application of a radial force.

Furthermore, if a resistance larger than a torque outputted by motor shaft 311 is encountered at a position while driving the fastener and causes a tooth slippage phenomenon in which bevel gear 42 repeatedly engages with and disengages from end toothed portions 232 and 242 of first and second ring gears 23 and 24, body 10 can be manually rotated to overcome the resistance and to forcibly drive the fastener through the position at the moment bevel gear 42 engages with end toothed portions 232 and 242 of first and second ring gears 23 and 24. Bevel gear 42 reengages with end toothed portions 232 and 242 of first and second ring gears 23 and 24 after the fastener passes through the position. Thus, driving member 21 can be driven by motor 31 again to rotate about second axis L2 to thereby drive the fastener to rotate. Thus, the problems of conventional ratchet wrenches resulting from excessive large resistances are overcome.

Furthermore, since first angle α is 120°, in manufacture of connection hole 13 of body 10, a drill with a diameter equal to first inner diameter D1 is used to firstly form first section 131. Then, another drill with a diameter equal to second inner diameter D2 is used to form second section 132 intercommunicated with transmission groove 14. After processing by a cutting end of the drill with a diameter equal to first inner diameter D1, first angle α of 120° can be formed between the inner wall face of third section 133 and the inner wall face of first section 131. The manufacturing costs are reduced by rapid processing.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:
1. An electric ratchet wrench comprising:
a body including a first end and a second end, with the first end of the body including an inner periphery having a toothed portion;
a ratchet device mounted to the first end of the body, with the ratchet device including a driving member, a pawl device, a first ring gear rotatably mounted around the driving member, a second ring gear rotatably mounted around the driving member, and a direction switching rod received in the driving member, with the pawl device mounted between the first and second ring gears and including two primary pawls, a first secondary pawl, and a second secondary pawl, with each of the two primary pawls pivotably mounted to the driving member and selectively meshing with the toothed portion of the body, with each of the first and second ring gears rotatable relative to the driving member in a clockwise direction or a counterclockwise direction, with each of the first and second ring gears including an inner toothed portion on an inner periphery thereof and an end toothed portion on an end face thereof, with the end toothed portions of the first and second ring gears facing each other, with the first secondary pawl selectively meshing with the inner toothed portion of the first ring gear, with the second secondary pawl selectively meshing with the inner toothed portion of the second ring gear, with the driving member including an end adapted for directly or indirectly driving a fastener, with the direction switching rod pivotable relative to the driving member between two positions respectively corresponding to a driving direction and a non-driving direction, wherein when the direction switching rod pivots between the two positions, an engagement status between each of the two primary pawls and the toothed portion of the body and an engagement status between the first and second secondary pawls and the first and second ring gears are changed to provide a direction switching function;
a power device received in the second end of the body, with the power device including a motor and a power source, with the motor including a motor shaft, with the power source electrically connected to the motor for driving the motor shaft; and
a transmission device including a transmission shaft, a bevel gear, and a first elastic element, with the transmission shaft rotatably mounted in the body and including a first end coupled with the motor shaft of the motor, with the transmission shaft further including a second end with a transmission portion, with the bevel gear mounted around the transmission portion and movable relative to the transmission shaft to selectively mesh with or disengage from the end toothed portions of the first and second ring gears, and with the first elastic element mounted around the transmission portion of the transmission shaft and biasing the bevel gear to mesh with the end toothed portions of the first and second ring gears, wherein when the bevel gear meshes with the end toothed portions of the first and second ring gears and when the motor shaft of the motor drives the transmission shaft and the bevel gear to rotate, the bevel gear drives the first and second ring gears to respectively rotate in the clockwise direction or the counterclockwise direction relative to the driving member, the two primary pawls and one of the first and second secondary pawls actuate the driving member to rotate to thereby rotate the fastener, and wherein a resistance larger than a torque outputted by the motor shaft is encountered at a position while driving the fastener and causes a tooth slippage phenomenon in which the bevel gear repeatedly engages with and disengages from the end toothed portions of the first and second ring gears, the body can be manually rotated to overcome the resistance and to forcibly drive the fastener through the position at a moment the bevel gear engages with the end toothed portions of the first and second ring gears, and the bevel gear reengages with the end toothed portions of the first and second ring gears after the fastener passes through the position.

2. The electric ratchet wrench as claimed in claim 1, with the body including a connection hole, with the transmission shaft rotatably received in the connection hole and including a connection portion having the first end, with the transmission shaft further including a shoulder connected between the transmission portion and the connection portion, with the first elastic element mounted between the shoulder and the bevel gear, and with the transmission device further including a first ball unit mounted between the connection hole and the transmission shaft.

3. The electric ratchet wrench as claimed in claim 2, with the connection hole including first, second, and third sections arranged along a first axis, with the first section having a first inner diameter perpendicular to the first axis, with the second section having a second inner diameter perpendicular to the first axis, with the second inner diameter smaller than the first inner diameter, with the third section having two ends respectively connected to the first and second sections, with an inner wall face of the third section being at a first angle of 120° to an inner wall face of the first section, with the connection portion having a first outer diameter perpendicular to the first axis, with the shoulder having a second outer diameter perpendicular to the first axis, with the second outer diameter smaller than the first outer diameter, with the connection portion having a conical face connected to the shoulder, and with the conical face of the connection portion at a second angle of 120° to an outer face of the shoulder.

4. The electric ratchet wrench as claimed in claim 3, with the first ball unit having a plurality of balls arranged in a circumferential direction about the first axis, and with the plurality of balls mounted in the third section of the connection hole and located between the connection portion and the shoulder of the transmission shaft.

5. The electric ratchet wrench as claimed in claim 4, with the motor shaft of the motor including a first shaft section and a second shaft section arranged along the first axis, with the first shaft section having a first shaft diameter perpendicular to the first axis and having circular cross sections perpendicular to the first axis, with the second shaft section having a second shaft diameter perpendicular to the first axis and having semi-circular cross sections perpendicular to the first axis, and with the second shaft diameter smaller than the first shaft diameter, with the transmission device further including a first washer, a second elastic element, a second washer, and a second ball unit, with the first washer having a semi-circular hole corresponding to the second shaft section of the motor shaft, with the second washer having a circular hole, with the first washer, the second elastic element, and the second washer mounted around the second shaft section of the motor shaft in sequence, with a side of the first washer abutting the first shaft section, with the second elastic element mounted between another side of the first washer and a side of the second washer facing away from the second ball unit, with the second washer received in the first section of the connection hole, and with the first end of the transmission shaft including a receptacle receiving the second shaft section of the motor shaft, with the first end of the transmission shaft further including a reduced section having an outer periphery and an annular end face, with the second ball unit including a plurality of balls arranged in a circumferential direction about the first axis and located between an inner periphery of the first section of the connection hole and the outer periphery of the reduced section of the first end of the transmission shaft and located between the second washer and the annular end face of the reduced section of the first end of the transmission shaft.

6. The electric ratchet wrench as claimed in claim 5, with each of the first and second elastic elements being a coil spring, and with the first elastic element having a stiffness coefficient smaller than a stiffness coefficient of the second elastic element.

7. The electric ratchet wrench as claimed in claim 2, with the body including a head, a handle adapted to be held by a user, and an extension between the head and the handle, with the head located on the first end of the body, with the handle located between the extension and the second end of the body along the first axis, with the head including a driving hole and a transmission groove intercommunicated with the driving hole, with the driving hole including the inner periphery having the toothed portion, with the handle including a compartment receiving the power device, with the connection hole defined in the extension, and with the extension having substantially rectangular cross sections perpendicular to the first axis.

8. The electric ratchet wrench as claimed in claim 7, with the transmission groove being crescent in cross section and defined in the head, and with the transmission groove including two closed ends spaced from each other in a transverse direction perpendicular to the first axis.

9. The electric ratchet wrench as claimed in claim 7, with the handle of the body including a through-hole extending in a radial direction perpendicular to the first axis, with the through-hole intercommunicated with the compartment, with the power device including a control button received in the through-hole of the body and electrically connected to the motor, and with the control button operable to control the motor.

10. The electric ratchet wrench as claimed in claim 2, with the motor being a monodirectional motor, with the motor shaft rotatable about the first axis, with the driving member rotatably mounted in the body and rotatable about a second axis perpendicular to the first axis, with each of the first and second ring gears rotatable about the second axis in the clockwise direction or the counterclockwise direction relative to the driving member, with one of the two primary pawls and the first secondary pawl jointly pivotable about a third axis parallel to the second axis, with another of the two primary pawls and the second secondary pawl jointly pivotable about a fourth axis parallel to the second axis, with the second axis located between the third and fourth axes, with the two primary pawls located on a same level along the second axis, with the first secondary pawl and the second secondary pawl opposed to each other in a diametric direction perpendicular to the second axis and located on different levels along the second axis, and with the two primary pawls located between the first and second secondary pawls along the second axis.

11. The electric ratchet wrench as claimed in claim 10, with the direction switching rod including a through-hole extending in a diametric direction perpendicular to the second axis, with the direction switching rod further including a first receptacle having a first opening, with the direction switching rod further including a second receptacle having a second opening, with the through-hole of the direction switching rod located between the first and second receptacles along the second axis, with the second opening facing away from the first opening and diametrically opposed to the first opening, with the driving device including a primary pressing unit, a first pressing unit, and a second pressing unit, with the primary pressing unit mounted in the through-hole of the direction switching rod and including two first pressing members and an elastic element mounted between the two first pressing members and biasing the two first pressing members to respectively press against the two primary pawls, with the first pressing unit mounted in the first receptacle of the direction switching rod and including a second pressing member and an elastic element biasing the second pressing member to press against the first secondary pawl, and with the second pressing unit mounted in the second receptacle of the direction switching rod and including a third pressing member and an elastic element biasing the third pressing member to press against the second secondary pawl.

12. The electric ratchet wrench as claimed in claim 1, with the transmission shaft axially fixed in the body.

13. An electric ratchet wrench comprising:
a body including a first end and a second end along a first axis, with the first end of the body including an inner periphery having a toothed portion;
a ratchet device mounted to the first end of the body, with the ratchet device including a driving member rotatably mounted in the body and rotatable about a second axis perpendicular to the first axis, a pawl device, a first ring gear rotatably mounted around the driving member, a second ring gear rotatably mounted around the driving member, and a direction switching rod received in the driving member, with the pawl device mounted between the first and second ring gears and including two primary pawls, a first secondary pawl, and a second secondary pawl, with each of the two primary pawls pivotably mounted to the driving member and selectively meshing with the toothed portion of the body, with each of the first and second ring gears rotatable relative to the driving member in a clockwise direction or a counterclockwise direction, with each of the first and second ring gears including an inner toothed portion on an inner periphery thereof and an end toothed portion on an end face thereof, with the end toothed portions of the first and second ring gears facing each other, with the first secondary pawl selectively meshing with the inner toothed portion of the first ring gear, with the second secondary pawl selectively meshing with the inner toothed portion of the second ring gear, with the driving member including an end adapted for directly or indirectly driving a fastener, with the direction switching rod pivotable relative to the driving member between two positions respectively corresponding to a driving direction and a non-driving direction, wherein when the direction switching rod pivots between the two positions, an engagement status between each of the two primary pawls and the toothed portion of the body and an engagement status between the first and second secondary pawls and the first and second ring gears are changed to provide a direction switching function;
a power device received in the second end of the body, with the power device including a motor and a power source, with the motor including a motor shaft, with the power source electrically connected to the motor for driving the motor shaft; and
a transmission device including a transmission shaft, a bevel gear, and a first elastic element, with the transmission shaft rotatably mounted in the body along the first axis and including a first end coupled with the motor shaft of the motor, with the transmission shaft further including a second end with a transmission portion, with the bevel gear mounted around the transmission portion and movable relative to the transmission shaft to selectively mesh with or disengage from the end toothed portions of the first and second ring gears, and with the first elastic element mounted around the transmission portion of the transmission shaft and biasing the bevel gear to mesh with the end toothed portions of the first and second ring gears,
wherein when a user intends to tighten or loosen a fastener, the fastener has to go through a low resistance stage and a high resistance stage;
wherein a resistance in the low resistance stage smaller than a torque outputted by the motor shaft causes a tooth coupled phenomenon in which the bevel gear meshes with the end toothed portions of the first and second ring gears and the motor shaft of the motor drives the transmission shaft and the bevel gear to rotate, the bevel gear drives the first and second ring gears to respectively rotate in the clockwise direction or the counterclockwise direction relative to the driving member, the two primary pawls and one of the first and second secondary pawls actuate the driving member to rotate to thereby rapidly and continuously rotate the fastener, and
wherein the resistance in the high resistance stage larger than the torque outputted by the motor shaft causes a tooth slippage phenomenon in which the bevel gear repeatedly engages with and disengages from the end toothed portions of the first and second ring gears while the bevel gear cannot drive the first and second ring gears to rotate, the body can be manually rotated to overcome the resistance in the high resistance stage and to forcibly drive the fastener to pass through the high resistance stage at a moment the bevel gear engages with the end toothed portions of the first and second ring gears, and the bevel gear reengages with the end toothed portions of the first and second ring gears after the fastener passes through the high resistance stage.

14. An electric ratchet wrench comprising:
a body including a first end and a second end along a first axis;
a ratchet device mounted to the first end of the body, with the ratchet device including a driving member rotatably mounted in the body and rotatable about a second axis perpendicular to the first axis, a pawl device, a first ring gear rotatably mounted around the driving member, a second ring gear rotatably mounted around the driving member, with the driving member including an end adapted for directly or indirectly driving a fastener;
a power device received in the second end of the body, with the power device including a motor and a power source electrically connected to the motor for driving the motor shaft; and
a transmission device including a transmission shaft, a bevel gear, and a first elastic element, with the transmission shaft rotatably mounted in the body along the first axis and including a first end coupled with the motor, with the transmission shaft further including a second end with a transmission portion, with the bevel gear mounted around the transmission portion and movable relative to the transmission shaft to selectively mesh with or disengage from the first and second ring gears, and with the first elastic element mounted around the transmission portion of the transmission shaft and biasing the bevel gear to mesh with the end toothed portions of the first and second ring gears,
wherein when a user intends to tighten or loosen a fastener, the fastener has to go through a low resistance stage and a high resistance stage;
wherein a resistance in the low resistance stage smaller than a torque outputted by the motor causes a tooth coupled phenomenon in which the bevel gear meshes with the first and second ring gears and the motor drives the transmission shaft and the bevel gear to rotate, the bevel gear drives the first and second ring gears to respectively rotate in the clockwise direction or the counterclockwise direction relative to the driving member to actuate the driving member to rotate to thereby rapidly and continuously rotate the fastener, and
wherein the resistance in the high resistance stage larger than the torque outputted by the motor shaft causes a tooth slippage phenomenon in which the bevel gear repeatedly engages with and disengages from the end toothed portions of the first and second ring gears while the bevel gear cannot drive the first and second ring gears to rotate, the body can be manually rotated to overcome the resistance in the high resistance stage and to forcibly drive the fastener to pass through the high resistance stage at a moment the bevel gear engages with the first and second ring gears, and the bevel gear reengages with the first and second ring gears alter the fastener passes through the high resistance stage.

15. An electric ratchet wrench comprising:
a body including a first end and a second end along a first axis;
a ratchet device mounted to the first end of the body, with the ratchet device including a driving member rotatably mounted in the body and rotatable about a second axis perpendicular to the first axis, a pawl device, a first ring gear rotatably mounted around the driving member, a second ring gear rotatably mounted around the driving member, with the driving member including an end adapted for directly or indirectly driving a fastener;
a power device received in the second end of the body, with the power device including a motor and a power source electrically connected to the motor for driving the motor shaft; and
a transmission device including a transmission shaft, a bevel gear, a first elastic element, and a second elastic element, with the transmission shaft rotatably mounted in the body along the first axis and including a first end coupled with the motor, with the transmission shaft further including a second end with a transmission portion, with the bevel gear mounted around the transmission portion and movable along the transmission shaft to selectively mesh with or disengage from the first and second ring gears, with the first elastic element mounted around the transmission portion of the transmission shaft and biasing the bevel gear to mesh with the end toothed portions of the first and second ring gears, with the second elastic element mounted between the motor and the first end of the transmission shaft, and with the first elastic element having a stiffness coefficient smaller than a stiffness coefficient of the second elastic element;
wherein when a user intends to tighten or loosen a fastener, the fastener has to go through a low resistance stage and a high resistance stage;
wherein a resistance in the low resistance stage smaller than a torque outputted by the motor causes a tooth coupled phenomenon in which the bevel gear meshes with the first and second ring gears and the motor drives the transmission shaft and the bevel gear to rotate, the bevel gear drives the first and second ring gears to respectively rotate in the clockwise direction or the counterclockwise direction relative to the driving member to actuate the driving member to rotate to thereby rapidly and continuously rotate the fastener, and
wherein the resistance in the high resistance stage larger than the torque outputted by the motor shaft causes a tooth slippage phenomenon in which the bevel gear repeatedly engages with and disengages from the end toothed portions of the first and second ring gears while the bevel gear cannot drive the first and second ring gears to rotate, the body can be manually rotated to overcome the resistance in the high resistance stage and to forcibly drive the fastener to pass through the high resistance stage at a moment the bevel gear engages with the first and second ring gears, and the bevel gear reengages with the first and second ring gears after the fastener passes through the high resistance stage.

* * * * *